US007333801B2

(12) United States Patent
Chandhok (10) Patent No.: US 7,333,801 B2
(45) Date of Patent: Feb. 19, 2008

(54) METHOD AND APPARATUS FOR TRANSLATING RESOURCE NAMES IN A WIRELESS ENVIRONMENT

(75) Inventor: Ravinder Paul Chandhok, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 631 days.

(21) Appl. No.: 10/455,563

(22) Filed: Jun. 4, 2003

(65) Prior Publication Data

US 2004/0248558 A1    Dec. 9, 2004

(51) Int. Cl.
*H04Q 7/20* (2006.01)
(52) U.S. Cl. .................. 455/412.1; 455/414.1
(58) Field of Classification Search ............ 455/412.1, 455/414.1, 414, 406; 709/206, 247, 246, 709/227; 725/90; 711/108
See application file for complete search history.

(56) References Cited

U.S. PATENT DOCUMENTS

| | | | | |
|---|---|---|---|---|
| 5,864,852 A | | 1/1999 | Luotonen ..................... 707/10 |
| 6,052,730 A | * | 4/2000 | Felciano et al. ............ 709/225 |
| 6,081,842 A | * | 6/2000 | Shachar ..................... 709/229 |
| 6,119,167 A | * | 9/2000 | Boyle et al. ................ 709/234 |
| 6,345,307 B1 | | 2/2002 | Booth ........................ 709/247 |
| 6,473,609 B1 | * | 10/2002 | Schwartz et al. ........... 455/406 |
| 6,536,043 B1 | | 3/2003 | Guedalia ..................... 725/90 |
| 2001/0016875 A1 | * | 8/2001 | Schwartz et al. ........... 709/206 |
| 2002/0056010 A1 | * | 5/2002 | Lincoln et al. ............. 709/247 |
| 2002/0083341 A1 | * | 6/2002 | Feuerstein et al. ......... 713/201 |
| 2002/0103933 A1 | * | 8/2002 | Garon et al. ................ 709/246 |
| 2003/0093568 A1 | * | 5/2003 | Deshpande ................. 709/247 |
| 2003/0233514 A1 | * | 12/2003 | Honig ........................ 711/108 |

* cited by examiner

*Primary Examiner*—Joseph Feild
*Assistant Examiner*—Michael Vu
(74) *Attorney, Agent, or Firm*—Fariba Yadegar-Bandari; Robert J. O'Connell; Thomas Rouse (57) ABSTRACT

Method and apparatus for translating resource names in a wireless environment. A method is provided for translating a resource locator in a data network for transmission over a low bandwidth channel to a wireless device. The method includes steps of detecting a resource locator in a message transmitted to the wireless device, wherein the resource locator exceeds a selected length, and compressing the resource locator to obtain a corresponding resource identifier that is shorter in length than the resource locator. The method also comprises steps of substituting the resource identifier for the resource locator in the message to form an updated message, and transmitting the updated message to the wireless device using the low bandwidth channel.

18 Claims, 8 Drawing Sheets

METHOD AND APPARATUS FOR TRANSLATING RESOURCE NAMES IN A WIRELESS ENVIRONMENT

BACKGROUND

I. Field

The present invention relates generally to wireless data networks, and more particularly, to a method and apparatus for translating resource names in a wireless data network to provide efficient resource utilization.

II. Description of the Related Art

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

Typically, a network resource is accessed through a Universal Resource Locator (URL), which can be used to describe the location of a resource and a method or scheme for accessing it. Due to various reasons, URLs that indicate Hypertext Transfer Protocol (HTTP) based resources are widely used as references for information on the Internet. Given the broad availability of HTTP servers, it has become common practice to encode both dynamic and static information into URLs. This leads to network behavior that is more dynamic but has the disadvantage that URLs have become longer and longer in size—often to the point that they are only useable in computer software and not by humans. Another disadvantage of long URLs is that they require the network to have a certain amount of transmission capacity in order to transmit them efficiently.

One example where transmission capacity is limited is in a wireless network environment. In wireless environments, a variety of portable cellular telephones, personal digital assistants (PDAs), and paging devices may communicate over a wireless network. The wireless network may also include network servers that couple the wireless network to a public network, such as the Internet. This allows resources on the public network to be made available to wireless devices on the wireless network.

However, long URLs used in the public network are often too long to transmit in practical sized transport methods used in the wireless environment. For example, in a wireless environment transport methods such as the Short Message System (SMS) transport, the Short Data Burst (SDB) method of CDMA2000, or other low cost communication control channel transport methods, such as a paging channel, are used. Instead, long URLs must be transported in a wireless environment using more expensive dedicated traffic channels. This results in less efficient resource utilization, which translates into higher costs and possibly decreased system performance.

Therefore, what is needed is a way to transmit resource names to devices in a wireless environment that makes efficient use of the limited resources available, thereby increasing efficiency and lowering costs.

SUMMARY

In one or more embodiments, a system including methods and apparatus is provided to compress/translate network resource names for transmission over low bandwidth communication channels. In one embodiment, an arbitrary URL is compressed/translated into a semi-permanent resource identifier referred to as a Universal Resource Name (URN) for transmission over a low bandwidth channel used in a wireless communication network. In one embodiment, URL compression is done in a transparent fashion so that neither the sender nor receiver is aware that compression was performed. In other embodiments, URL compression is done with the knowledge of the endpoints that are using the URL in the communication network. Thus, the system serves as both a dynamic URL encoder and a URN resolver, and therefore allows one of the most common information formats on the Internet to be expressed in a way that allows for efficient transport over the scarce resources available in a wireless environment.

In one embodiment, a method is provided for compressing a resource locator in a data network for transmission over a low bandwidth channel to a wireless device. The method comprises detecting a resource locator in a message transmitted to the wireless device, wherein the resource locator exceeds a selected length, and compressing the resource locator to obtain a corresponding resource identifier that is shorter in length than the resource name. The method also comprises substituting the resource identifier for the resource locator in the message to form an updated message, and transmitting the updated message to the wireless device using the low bandwidth channel.

In another embodiment, apparatus is provided for compressing a resource locator in a data network for transmission over a low bandwidth channel to a wireless device. The apparatus comprises detection logic that operates to detect a resource locator in a message transmitted to the wireless device, wherein the resource locator exceeds a selected length. The apparatus also comprises compression logic that operates to compress the resource locator to a corresponding resource identifier that is shorter in length than the resource locator, and processing logic that operates to substitute the resource identifier for the resource locator in the message to form an updated message. The apparatus also comprises a transmitting logic that operates to transmit the updated message to the wireless device using the low bandwidth channel.

In another embodiment, apparatus translating a resource locator in a data network for transmission over a low bandwidth channel to a wireless device is provided. The apparatus comprises detection means for detecting a resource locator in a message transmitted to the wireless device, wherein the resource locator exceeds a selected length. The apparatus also comprises compression means for compressing the resource locator to produce a corresponding resource identifier that is shorter in length than the resource locator. The apparatus also comprises substitution means for substituting the resource identifier for the resource locator in the message to form an updated message. The apparatus also comprises transmission means for transmitting the updated message to the wireless device using the low bandwidth channel.

In another embodiment, a computer-readable medium is provided that contains computer-executable instructions for compressing a resource locator in a data network for transmission over a low bandwidth channel to a wireless device. The instructions when executed perform a method that comprises detecting a resource locator in a message transmitted to the wireless device, wherein the resource locator exceeds a selected length. The method also comprises compressing the resource locator to obtain a corresponding resource identifier that is shorter in length than the resource locator. The method also comprises substituting the resource identifier for the resource locator in the message to form an updated message. The method also comprises transmitting the updated message to the wireless device using the low bandwidth channel.

In another embodiment, a carrier wave signal is provided that comprises program instructions executable by a processor for compressing a resource locator in a data network for transmission over a low bandwidth channel to a wireless device. The carrier wave signal comprises program instructions for detecting a resource locator in a message transmitted to the wireless device, wherein the resource locator exceeds a selected length. The carrier wave signal also comprises program instructions for compressing the resource locator to obtain a corresponding resource identifier that is shorter in length than the resource locator. The carrier wave signal also comprises program instructions for substituting the resource identifier for the resource locator in the message to form an updated message. The carrier wave signal also comprises program instructions for transmitting the updated message to the wireless device using the low bandwidth channel.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a system that includes methods and apparatus to compress/translate an arbitrary URL into a semi-permanent URN. The system is suitable for use with wireless networks to allow URLs to be efficiently transmitted over low bandwidth channels to a wireless device, thereby allowing the wireless device to access various network resources in an efficient and cost effective manner. In one or more embodiments, resource name compression/translation is achieved by performing the following steps.
1. Determining long URLs that are to be transmitted over a wireless network to a network enabled wireless device.
2. Translating the long URLs to obtain compress/translated URNs.
3. Transmitting the URNs to the wireless device using the limited resources available to communicate with the wireless device.
4. Receiving from the wireless device, a request to receive a network resource associated with a selected URN.
5. Resolving the selected URN to obtain its original URL.
6. Requesting the network resource associated with the original URL for transmission to the wireless device.

Figure 1:
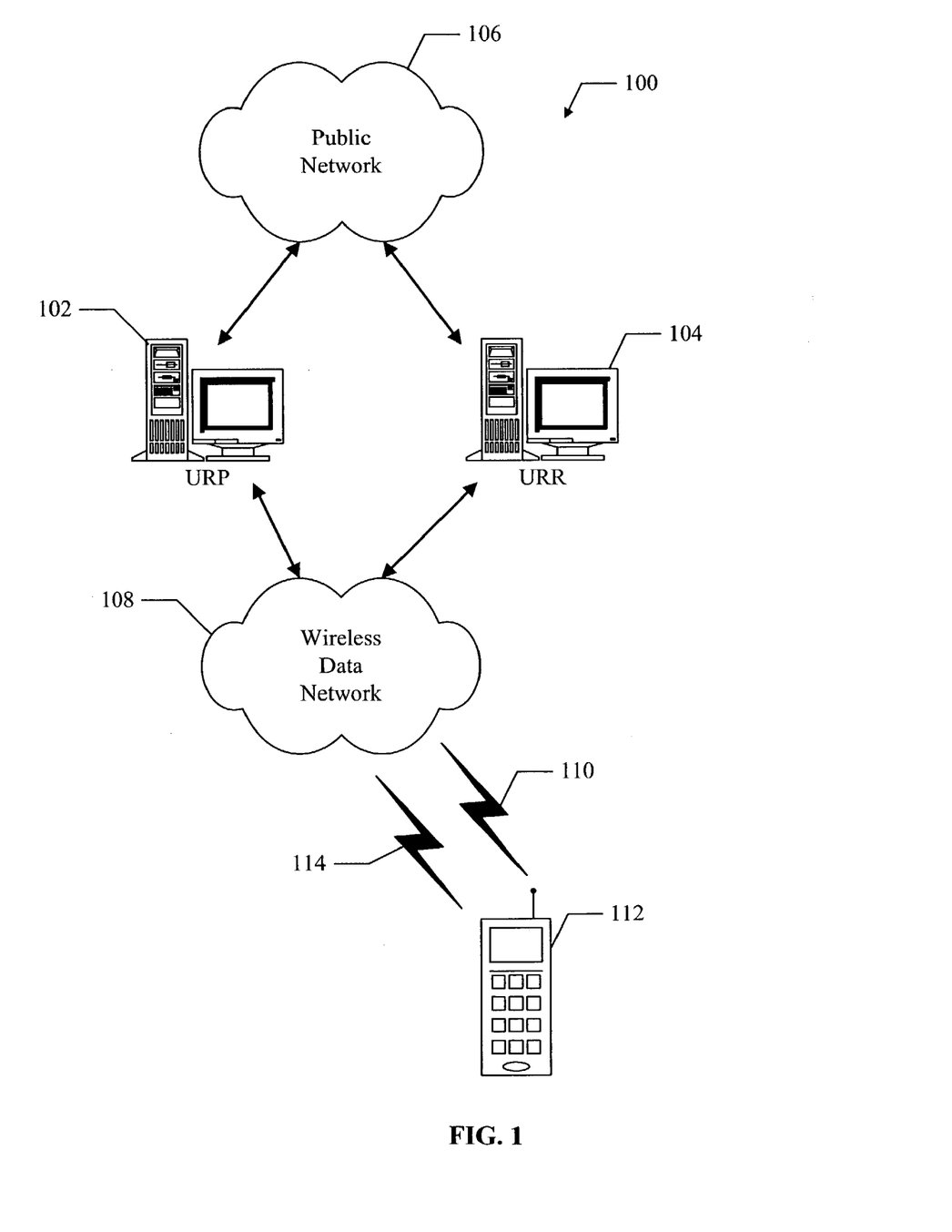
FIG. 1 shows one embodiment of a data network that includes a system to compress/translate resource names.

FIG. 1 shows one embodiment of a data network 100 that includes a system to compress/translate resource names. The network 100 comprises a Universal Resource Proxy (URP) server 102 and a Universal Resource Register (URR) server 104 that have logic to communicate over a public data network 106, such as the Internet. The URP 102 and the URR 104 also comprise logic to communicate over a wireless data network 108. The data network 108 also include limited bandwidth wireless communication channel 110 to a wireless device 112. For example, the wireless data network 108 may be a wireless cellular communication network and the wireless device 112 may be a network-enabled cellular telephone. The limited bandwidth channel 110 may be a control channel or a paging channel used to communicate small amounts of information between the network 108 and the wireless device 112. A traffic channel 114 is also shown. The traffic channel 114 is a high-speed dedicated channel that is used to communicate large amounts of information between the network 108 and the device 112. The traffic channel 114 is an expensive resource and typically used for voice communication or communication of information that is too large to be communicated over the limited bandwidth channel 110.

During operation of the network 100, information may be transmitted to the wireless device 112 from the public network 106 via the URP 102. The URP 102 includes logic to scan textual information and other known information encodings in these transmissions to detect long URLs and replace them with compressed/translated URNs by utilizing the services of the URR 104. For example, a long URL is a URL that is too long to be transmitted over the low bandwidth communication channel 110, and therefore would require use of the expensive traffice channel 114 for communication to the wireless device 112. Thus, the URR 104 serves as both a dynamic registration authority for new URL to URN mappings, and also as a URN resolver for the URNs that it previously registered. In one or more embodiments, the URR 104 may also be used by other network entities that are aware of its existence to provide these same services.

The URR 104 can be directly accessed to provide services to system components on the public network 106 side of the network 100 or by system components on the wireless network 108 side of the network 100, including software components in the wireless device 112. The URP 102, in contrast, sits between the two networks (106 and 108) and transparently coordinates compression/translation techniques to URLs transmitted to the wireless device 112. Thus, the URP 102 operates to optimize the functionality of the protocol stream between the wireless device 112 and other network entities without the explicit knowledge of either endpoint of the protocol session.

In one embodiment, the URP 102 and the URR 104 are distinct network servers located at different physical locations. In another embodiment, the URP 102 and the URR 104 are located at the same physical location, and in still another embodiment, the URP 102 and the URR 104 are the same device. Thus, in one or more embodiments, the URP 102 and the URR 104 may comprise virtually any network configuration.

Figure 2:
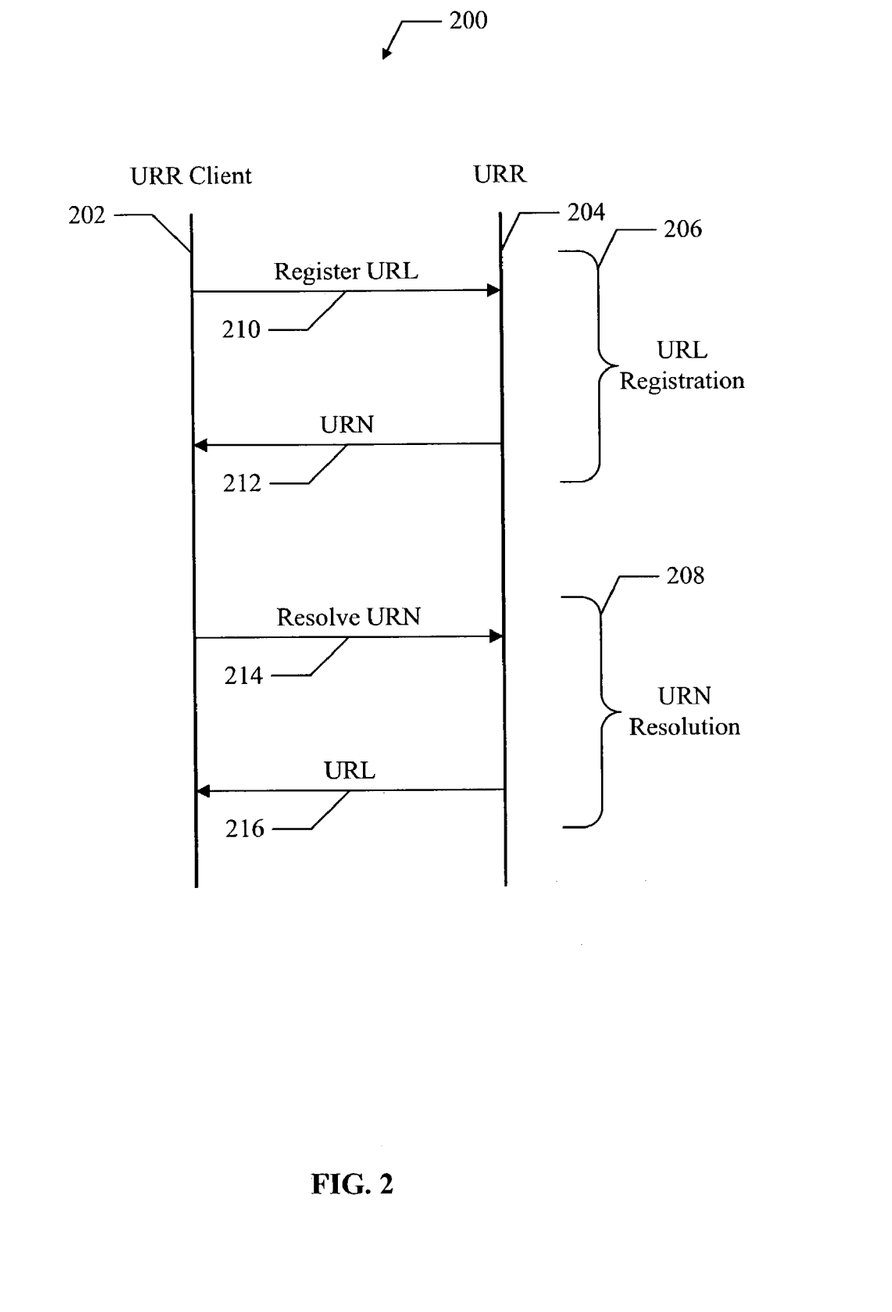
FIG. 2 shows one embodiment of transactions between a URR server and a URR client to provide URL registrations and resolutions in a data network.

FIG. 2 shows one embodiment of transactions 200 between a URR server 204 and a URR client 202 to provide URL registration and resolution in a data network. The transactions 200 demonstrate two URR interfaces that are defined as a URL registration interface 206 and a URN resolution interface 208. In one embodiment, the interfaces 206, 208 are provided via well known TCP ports, however, any suitable interface protocol may be used.

During operation of the URL registration interface 206, the URR client 202 (for example, the URP 102) explicitly requests the binding of a URL to a URN as shown at 210. In response, the URR 204 performs the requested compression/translation and transmits back the resulting URN as shown at 212. The resulting URN 212 represents a compressed and/or translated URL that may be communicated to a wireless device (i.e., device 112) over a limited bandwidth/capacity communication channel that couples the wireless device to the wireless network.

During operation of the URN resolution interface 208, the URR client 202 requests the resolution of a specific URN, as shown at 214. In one embodiment, the URR 204 performs an operation that is the inverse of registration process to resolve the specific URN to its original URL. The resolved URL is transmitted back to the URR client 202, as shown at 214. As a result, the URR client may then access the specific network resource associated with the resolved URL.

Figure 3:
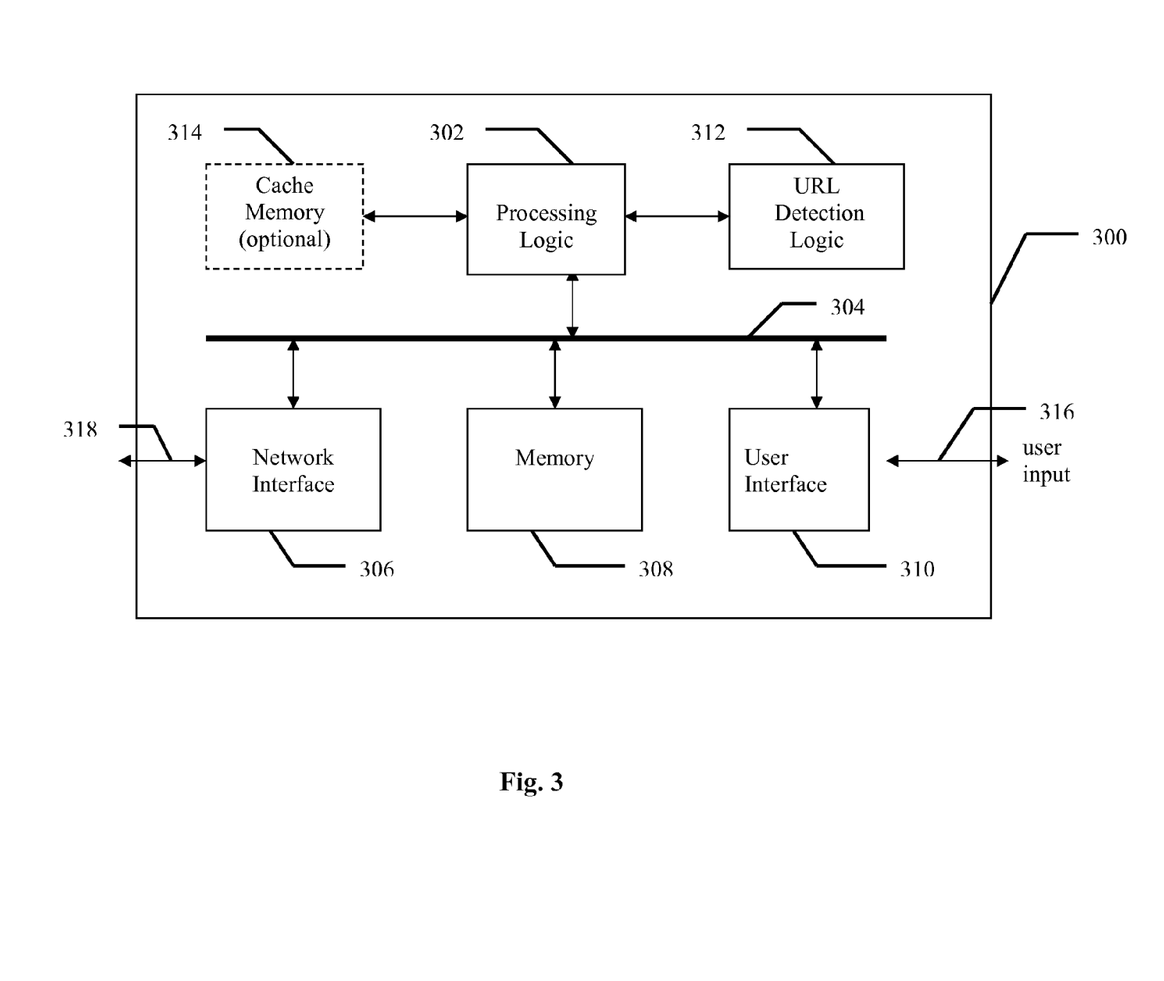
FIG. 3 shows one embodiment of a URP server for detecting URL encodings in a data network.

FIG. 3 shows one embodiment of a URP server 300 for detecting URL encodings in a data network. The URP 300 comprises processing logic 302 coupled to a data bus 304. Also coupled to the data bus 304 are a network interface 306, memory 308 and a user interface 310. The processing logic 302 is further coupled to URL detection logic 312 and optional cache memory 314. During operation of the URP 300, the processing logic 302 executes program instructions stored in the memory 308. In one or more embodiments, the processing logic 302 comprises a CPU, gate array, hardware logic, software or a combination of hardware and software. Thus, the processing logic 302 generally comprises circuitry necessary for executing machine-readable instructions stored in the memory 308 to provide the functions of the URP described herein.

The memory 308 comprises RAM, ROM, FLASH, EEROM, or a combination thereof. Thus, the memory 308 may comprise virtually any type of memory that is capable of storing instructions or other information for use by the URP 300.

The user interface 310 receives user input 316, for example, from a keypad, pointing device, touch pad, or other input mechanisms, such as audio circuitry, to receive and process voice commands. The user interface 310 may also provide outputs to various output mechanisms, such as a display, LEDs, audio speaker or other types of visual or audible indicators. Thus, the user interface 310 comprises hardware and/or software in any combination to allow the URP 300 to receive user input and output visual information or audible indicators to the user.

The network interface 306 operates to transmit and receive information between the URP 300 and other network entities via a network communication channel 318. For example, in one embodiment, the network interface 306 comprises logic to transmit and receive information over a public data network, such as the Internet, using the communication channel 318. In one embodiment, the network interface 306 also comprises logic to transmit and receive information over a wireless network, such as a wireless telecommunications network. Thus, the URP 300 may communicate with both wired and wireless networks and operate to process transmissions from one type of network to the other.

It should be noted that the configuration of the URP 300 is just one configuration suitable for providing resource name translations in a data network. It is also possible to use other configurations or other components having different configurations within the scope of the invention.

In one embodiment, the URP 300 is inserted between a public network and a wireless network, and operates to detect any URL encoding in transmissions from the public network to a wireless device located on the wireless network. For example, transmissions from the public network are received by the network interface 306. The processing logic 302 and the detection logic 312 processes these received transmissions to determine if any long URLs are included. For example, in one embodiment, the URP 300 acts a transparent HTTP proxy to intercept network transmissions to the wireless device. For example, it is well understood to those with skill in the art to insert a transparent HTTP proxy and cache to process or redirect network transmissions. For example, in one embodiment it is known to intercept port 80 transmissions. In another embodiment, the URP 300 acts as a proxy inserted into a SMS gateway to the wireless network. Such a proxy may intercept transmission to the wireless device and detect long URLs in the transmissions. For example, URLs having a length of more than 160 bytes may be detected and defined as long URLs. In another embodiment, URLs having a length of more than 256 bytes may be detected. Thus, it is possible for the URP 300 to use known techniques to detect URLs having virtually any selected length and determine that these detected URLs are long URLs.

If a long URL is detected, the processing logic operates to communicate with a URR server via the network interface 306 to request a URL registration as described with reference to FIG. 2. For example, URL registration can be achieved by contacting a registration interface of the URR server. When the URL is registered, the URR server returns a corresponding URN that is shorter than the original URL and designed to be transmitted to a wireless device via a low bandwidth channel. The processing logic 302 then operates to substitute the short URN for the long URL in the original transmission, and then re-transmits the transmission to the wireless device on the wireless network. Because the URN is much shorter than the original URL, the transmission to the wireless device on the wireless network can utilized efficient low bandwidth channels. Furthermore, in one embodiment, the functions of the URP 300 are transparent because neither the transmitting network entity nor the receiving wireless device are aware that anything has changed in the transmission.

The URP 300 may also include the optional cache memory 314 so that message content associated with one or more URLs may be cached. For example, a message sent to the wireless device may include long URLs and associated message content, such as audio or video files. In one embodiment, these files are cached in the cache memory 314 at the URP 300. A more detail discussion of the operation of the URP 300 with regards to the cache memory 314 is provided in another section of this document.

In one embodiment, the processing logic 302 of the URP 300 performs the described functions by executing program instructions stored on a computer-readable media. For example, the memory 308 comprises one type of computer-readable media. The program instructions may be stored into the memory 308 during manufacture of the URP 300. In another embodiment, the program instructions are loaded into the memory 308 via the user interface 310. For example, a user may download the instructions into the memory 308 via the user interface 310 from a local computer-readable media, such as a floppy disk, CD, memory card, FLASH memory device, ROM, or any other type of memory that may communicate instructions to the URP 300 via the user interface 310.

In another embodiment, instructions for execution by the processing logic 302 to perform the functions of the URP 300 are downloaded from a network entity via the network interface 306. For example, a central network management facility that has access to a public network may download the instructions through the public network for receipt by the URP 300. In this embodiment, the instructions are received from the network by the network interface 306 and stored in the memory 308 for execution by the processing logic 302 to perform the functions of the URP 300 described herein. Thus, the instructions are transmitted to the URP 300 via the public network in the form of a carrier wave signal.

Figure 4:
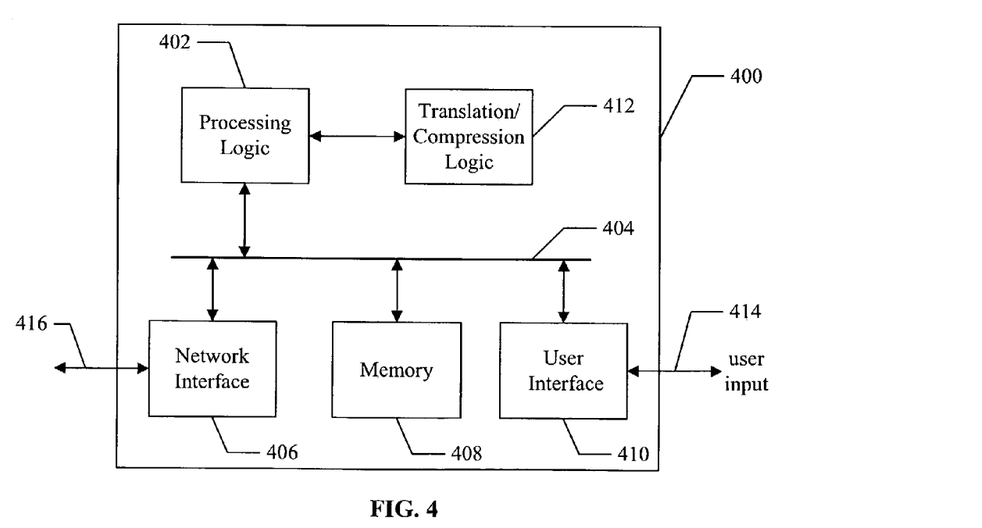
FIG. 4 shows one embodiment of a URR server for translating and/or compressing URLs in a data network.

FIG. 4 shows one embodiment of a URR server 400 for translating and/or compressing URLs in a data network. The URR 400 comprises processing logic 402 coupled to a data bus 404. Also coupled to the data bus 404 are a network interface 406, memory 408 and a user interface 410. The processing logic 402 is further coupled to translation/compression logic 412.

During operation of the URR 400, the processing logic 402 executes program instructions stored in the memory 408. In one or more embodiments, the processing logic 402 comprises a CPU, gate array, hardware logic, software or a combination of hardware and software. Thus, the processing logic 402 generally comprises circuitry operable for executing machine-readable instructions stored in the memory 408.

The memory 408 comprises RAM, ROM, FLASH, EEROM, or a combination thereof. Thus, the memory 408 may comprise virtually any type of memory that is capable of storing instructions and information for use by the URR 400.

The user interface 410 receives user input 414, for example, from a keypad, pointing device, touch pad, or other input mechanisms, such as audio circuitry that receives and processes voice commands. The user interface 410 may also provide outputs to various output mechanisms, such as a display, LEDs, audio speaker or other types of visual or audible indicators. Thus, the user interface 410 comprises hardware and/or software in any combination to allow the URR 400 to receive user input and output visual information or audible indicators to the user.

The network interface 406 comprises transmitting and receiving logic and operates to transmit and receive information between the URR 400 and other network entities via a network communication channel 416. For example, in one embodiment, the network interface 406 comprises logic to transmit and receive information over a public data network, such as the Internet, using the communication channel 416. In another embodiment, the network interface 406 also comprises logic to transmit and receive information over a wireless network, such as a wireless telecommunications network.

It should be noted that the configuration of the URR 400 is just one configuration suitable for providing resource name translations in a data network. It is also possible to use other configurations or other components having different configurations within the scope of the invention.

In one embodiment, the URR 400 is coupled to a public network and/or a wireless network via the network interface 406 and operates to provide URL registration and resolution to network clients. For example, in one embodiment, the URR 400 provides the registration interface 206 and the resolution interface 208 as described with reference to FIG. 2.

During operation, the URR 400 receives registration requests that include long URLs from network clients. The requests are received by the network interface 406 and processed by the processing logic 402. The processing logic 402 sends the long URLs to the translation logic 412 where the URL is compressed/translated to produce a short URN that is returned to the processing logic 402. The processing logic 402 then sends the short URN back to the network client that requested the registration via the network interface 406.

In one embodiment, the translation/compression logic 412 performs URL translation/compression by using known table-based translations. For example, in one embodiment, the translation logic 412 uses a monotonically increasing number to translate (or map) long URLs into short URNs. For example, a first long URL may be mapped to a URN expressed as; "http://A.1", the next long URL may be mapped to "http://A.2", the next mapped to "http://A.3", and so on. Thus, table based substitution using a monotonically increasing number compresses long URLs into short URNs. In another embodiment, a hashing technique is used to compress long URLs into short URNs. For example, it is known to use hashing functions to transform a string of characters into a shorter fixed-length value or key that represents the original string. In another embodiment, the URN is represented syntactically as a URL with a different scheme, for example, the scheme "URP". Thus, a long URL reference to "http://long-domain-name.com/big-path/even/more/text" might be represented as a short URN expressed as, "URP:293994." Thus, any known technique may be used by the translation logic 412 to translate/compress long URLs into short URNs.

During URL resolution, the URR 400 receives resolution requests that include short URNs from network clients. The requests are received by the network interface 406 and processed by the processing logic 402. The processing logic 402 sends the short URNs to the translation logic 412 where the URNs are resolved to produce original URLs that are sent back to the processing logic 402. The processing logic 402 then sends the URLs back to the network client via the network interface 406. In one embodiment, the resolution process performed by the translation logic 412 is the inverse of the registration process that was used to create the URN. For example, the resolution process may be the inverse of any of the registration processes described above. In one embodiment, the translation logic 412 comprises memory to store table-based mappings between URLs and associated URNs.

In one embodiment, the processing logic 402 and/or translation logic 412 of the URR 400 performs the described functions by executing program instructions stored on a computer-readable media. For example, the memory 408 is a computer-readable media that may be used to store instructions for execution by the processing logic 402. The program instructions may be stored into the memory 408 during manufacture of the URR 400. In another embodiment, the program instructions are loaded into the memory 408 via the user interface 410. For example, a user may download the instructions into the memory 408 via the user interface 410 from a local computer-readable media, such as a floppy disk, CD, memory card, FLASH memory device, ROM, or any other type of computer-readable media that may communicate instructions to the URR 400 via the user interface 410.

In another embodiment, instructions for execution by the processing logic 402 to perform the functions of the URR 400 are downloaded from a network entity via the network interface 406. For example, a central network management facility that has access to a public network may download the instructions through the public network for receipt by the URR 400. In this embodiment, the instructions are received from the public network by the network interface 406 and stored in the memory 408 for execution by the processing logic 402 to perform the functions of the URR 400 described herein. Thus, the instructions are transmitted to the URR 400 via the public network in the form of a carrier wave signal. This allows registration and resolution techniques to be added, changed, deleted, or updated as necessary using the public network.

Figure 5:
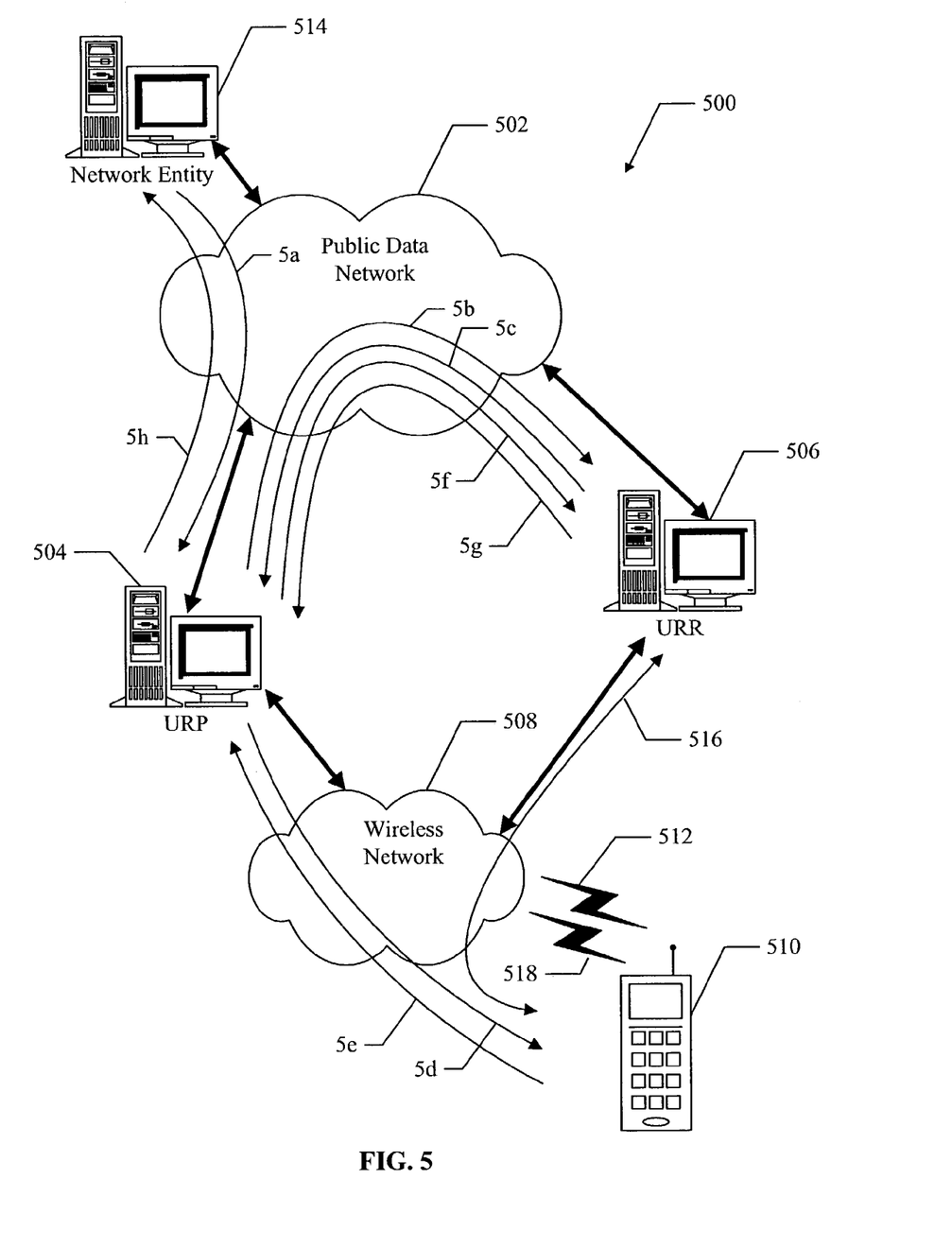
FIG. 5 shows one embodiment of a network that includes a URP server and a URR server suitable for providing resource name translations.

FIG. 5 shows one embodiment of a network 500 that includes a URP server and a URR server suitable for providing resource name translations in a data network. The network 500 comprises a public data network 502 that includes connections to a URP server 504 and a URR server 506. The URP 504 is coupled to a wireless data network 508 that is in wireless communication with a wireless device 510 via a low bandwidth wireless link 512. The network 508 may also communicate with the wireless device 510 via an expensive high-bandwidth traffic channel 518. Furthermore, the public network 502 is in communication with a network entity 514 that provides one or more network services to other entities on the public network 502.

Figure 6:
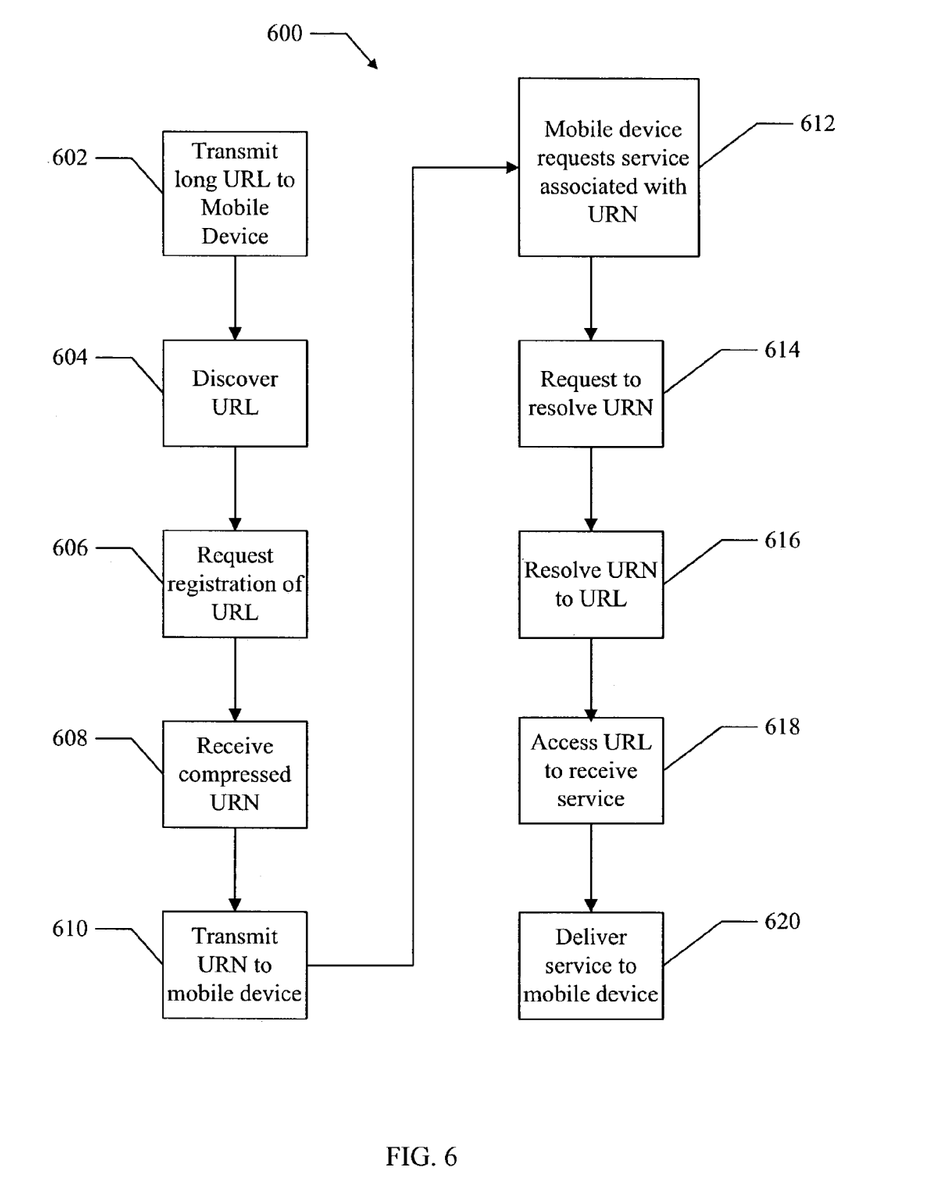
FIG. 6 shows one embodiment of a method for providing resource name translations in a data network.

FIG. 6 shows one embodiment of a method 600 for providing resource name translations in a data network. For example, the method 600 is suitable for use with the network 500 shown in FIG. 5. Therefore, for added clarity, the following detailed description of the method 600 includes additional references to the network 500.

Referring now to FIG. 6, the method 600 begins at block 602 where a long URL used by a network service is transmitted to a mobile device via a URP. For example, as shown in the network 500, the network entity 514 provides a network service and attempts to deliver a long URL (transmitted over path 5a), identifying the service to the wireless device 510 via the URP 504 and the networks 502, 508. For example, the long URL is too long to be transmitted to the device 510 via the low bandwidth channel 512.

At block 604, the URP discovers the long URL to be delivered to the wireless device. For example, by various methods (i.e., knowledge of the protocol, pattern matching, or other methods described herein) the URP 504 discovers that the URL (transmitted over path 5a) is long enough to be valuable in a compress/translated format.

At block 606, the URP requests to register the URL with a URR. For example, the URP 504 accesses the registration interface (i.e., interface 206) of the URR 506 and sends the long URL in a request for registration (transmitted over path 5b).

At block 608, as a result of the registration request in the previous step, a compressed/translated URN is transmitted by the URR to the URP. For example, the URR 506 produces a compressed/translated URN using one or more techniques described herein, such at table-based mapping, and transmits (over path 5c) the URN to the URP 504.

At block 610, the compressed/translated URN is substituted for the URL in the original transmission, which is then delivered to the wireless device over the wireless network using the low bandwidth channel 512. Thus, the compressed/translated URN is communicated over the limited resources available to the wireless device. For example, the URP 504 receives the compressed/translated URN (transmitted over path 5b) from the URR 506, substitutes the URN for the URL in the original transmission (transmitted over path 5a) to form an updated transmission, and delivers the updated transmission (transmitted over path 5d) to the wireless device 510 via the wireless network 508.

When the wireless device 510 requests to retrieve the resource associated with the URN, the URP and URR conspire to resolve the URN and redirect the request to the original resource as described in the following method steps.

At block 612, the wireless device attempts to retrieve the resource associated with the URN via the wireless network. For example, the wireless device 510 transmits a request (transmitted over path 5e) to receive the resource from the network entity 514. The URP 504 intercepts the request.

At block 614, the URP requests to resolve the URN. For example, the URP 504 accesses the resolution interface (i.e., interface 208) of the URR 506 and sends the URN (transmitted over path 5f) to the URR 506 be resolved.

At block 616, the URN is resolved to determine the original long URL. For example, the URR 506 resolves the URN (transmitted over path 5f) to produce the original URL by inverting the functionality originally used to create the URN. The resulting URL is transmitted (over path 5g) to the URP 504.

At block 618, the URP accesses the URL received from the URR to retrieve the network service requested by the wireless device. For example, the URP 504 receives the URL (transmitted over path 5g) from the URR 506 and uses it to access the network service provided by the network entity 514. For example, the access request is transmitted over path 5h. At block 620, the service requested from the network entity 514 is delivered to the wireless device 510.

In one or more embodiments, steps to resolve the URN described in blocks 612-618 can be accomplished in different ways. For example, in one embodiment, by exploiting the general functionality of modern computer systems to resolve references by dispatching code handlers for a particular scheme, the wireless device could have a specific URN resolver downloaded to it from a network management facility. The code handler directly contacts the URR to resolve the URN to obtain the corresponding URL. For example, the wireless device 510 includes a code handler to directly access the URR 506 using the wireless network 508, as shown at 516, and thereby resolve a received URN.

In another embodiment, the device 510 includes logic (i.e., software or code handlers) to resolve the URN and request the resulting URL resource directly from the network 508 without any interaction of the URP 504. For example, software to resolve the URN may be downloaded to the device 510 via the network 508. In another embodiment, after the device 510 requests resources associated with a specific URN, the corresponding URL is returned back to the device 510 via the high bandwidth channel 518 and the device 510 directly accesses the URL via the high bandwidth channel 518. Therefore, in accordance with the present invention, the URR 506 or the wireless device 510 may perform resolution of the URN, and the resources associated with the resulting URL retrieved by the mobile device 510 either directly or utilizing the services of the URP 504.

Figure 7:
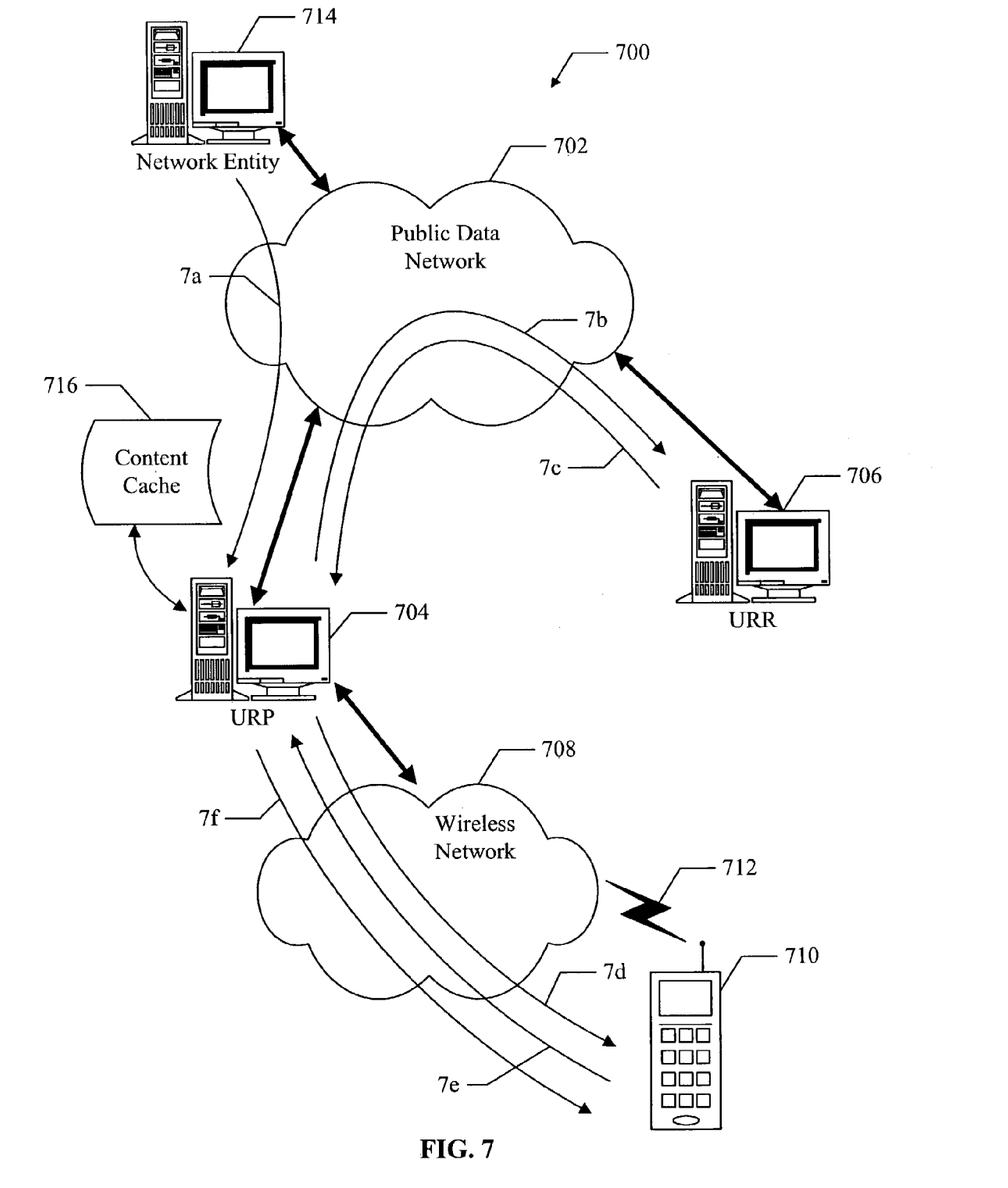
FIG. 7 shows one embodiment of a data network that performs resource name translation.

FIG. 7 shows one embodiment of a network 700 that performs resource name translation in a data network. The network 700 comprises a public data network 702 that includes network connections to a URP 704 and a URR 706. The URP 704 is coupled to a wireless data network 708 that is in wireless communication with a wireless device 710 via a low bandwidth wireless link 712. Furthermore, the public network 702 is in communication with a network entity 714 that provides one or more network services to other network entities.

The network 700 may also include other types of devices, such as other types of wireless and non-wireless devices, and these devices may communicate with the URP 704, URR 706 or any other network entity utilizing various network types and communication architectures, including wireless and non-wireless networks, private and public networks, switched and non-switched networks, direct links and any combination thereof.

Figure 8:
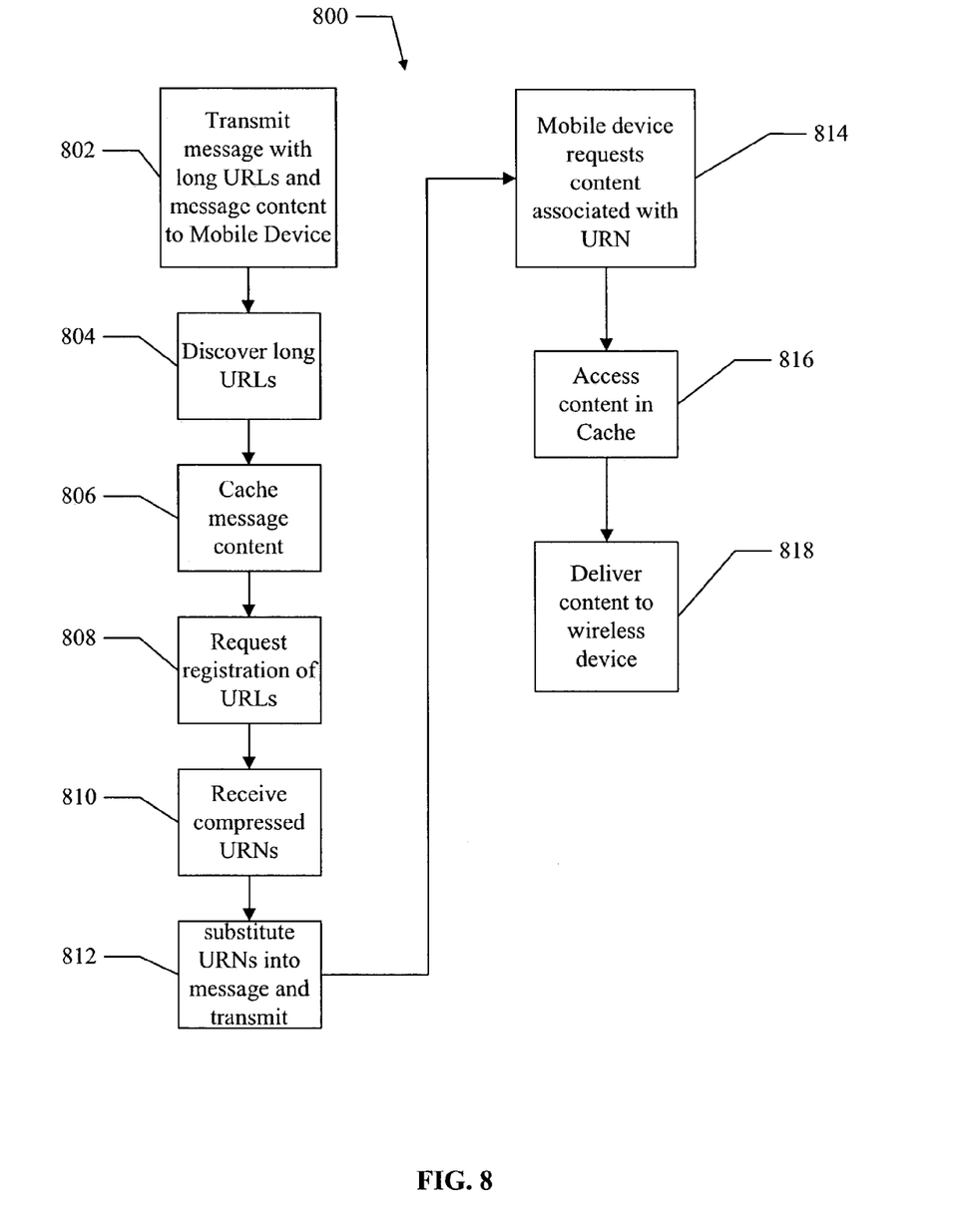
FIG. 8 shows one embodiment of a method for performing resource name translations in a data network.

FIG. 8 shows one embodiment of a method 800 for performing resource name translations in a data network. The method 800 illustrates how messages that include large URLs and associated message content can be efficiently transmitted to a wireless device on the wireless network. For example, the method 800 is suitable for use with the network 700 shown in FIG. 7. Therefore, for added clarity, the following detailed description of the method 800 includes additional references to the network 700.

Referring now to FIG. 8, the method 800 begins at block 802 where a message that includes one or more long URLs is transmitted (over path 7a) to a wireless device via a public data network. The message includes large amounts of message content associated with the URLs. For example, the message content may include picture data, video data, sound data, text data or any other type of message content.

At block 804, the message (transmitted over path 7a) is checked for long URLs that could not be efficiently transmitted to the wireless device using a low bandwidth channel. For example, the message is routed through a URP 704 that operates to discover one or more long URLs to be delivered to the wireless device. For example, by various methods (i.e., knowledge of the protocol, pattern matching, etc.), the URP 704 discovers that one or more long URLs are included in the message and that it would be valuable to provide the URLs in a compress/translated format to the wireless device 710.

At block 806, the URP operates to cache the message content that is included in the message. For example, the URP 704 includes a cache memory 716 that is used to cache the message content. This message content is associated with one or more URLs included in the message.

At block 808, the URP requests to register one or more long URLs included in the message that was transmitted over path 7a. For example, the URP 704 accesses the registration interface of the URR 706 and transmits (over path 7b) one or more URLs to be registered.

At block 810, as a result of the registration request in the previous step, a compressed/translated URN for each registered URL is transmitted by the URR to the URP. For example, the URR 706 transmits (over path 7c) the compressed/translated URNs to the URP 704. In one embodiment, the URP 704 also operates to associate the cached content with the corresponding URN received from the URR 706.

At block 812, the URP substitutes the compressed/translated URNs for the long URLs to form an updated message and delivers the updated message to the wireless device over the wireless network using the low bandwidth channel. Thus, the compressed/translated URNs are communicated over the limited resources available to the wireless device. For example, the URP 704 receives (over path 7c) the compressed/translated URNs from the URR 706 and substitutes the URNs into the message to form an updated message, and transmits (over path 7d) the updated message to the wireless device 710 via the wireless network 708.

The following steps describe how the cached message content stored at the cache memory 716 is transmitted to the wireless device 710. At block 814, the wireless device attempts to retrieve content associated with a URN that it has received via the wireless network. For example, the wireless device 710 transmits (over path 7e) a request to retrieve content associated with a URN via the wireless network 708.

At block 816, the URP accesses the message content associated with the received URN. For example, in response to the request received (over path 7e) from the wireless device 710, the URP request resolution of the URN from the URR 706. When the resolved URL is returned, the URP 704 retrieves the content from the cache that is associated with the URL and transmits it (over path 7f) to the device 710.

In another embodiment, tight translation is used to provide the cached content to the wireless device. In this embodiment, the URP accesses the message content stored in the cache 716 that is associated with the URN received from the wireless device 710. At block 818, the URP transmits (over path 7f) the associated content to the wireless device 710.

The method 800 allows the wireless device to receive a message with short URNs substituted for long URLs over a limited bandwidth channel. Thereafter, the wireless device accesses message content associated with the short URNs in a manner that is transparent to both the transmitting network entity and the wireless device.

The methods 600 and 800 are intended to be illustrative and not limiting of the operation of the various embodiments described herein. For example, it would be obvious to one with skill in the art to make minor changes, additions or deletions to any of the described methods. Furthermore, the described method steps may be combined, rearranged or reordered without deviating from the scope of the described embodiments.

A system for resource name compression/translation has been described that provide efficient use of limited bandwidth available for communication with wireless devices. The system is suitable for use with all types of wireless devices and is especially well suited for use with mobile telephones to provide fast and efficient access to resources on a data network.

Accordingly, while one or more embodiments of methods and apparatus for resource name compression/translation have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method of substituting a resource locator in a data network for transmission over a low bandwidth channel to a wireless device, the method comprising:

detecting a resource locator in a message transmitted to the wireless device;

determining whether the resource locator exceeds a selected length, and if the resource locator exceeds the selected length:

correlating the resource locator with a corresponding resource identifier that is shorter in length than the resource locator;

substituting the resource identifier for the resource locator in the message to form an updated message; and transmitting the updated message to the wireless device using the low bandwidth channel.

2. The method of claim 1, wherein the step of detecting comprises intercepting the message using a network proxy.

3. The method of claim 1, wherein the step of correlating comprises mapping the resource locator to the resource identifier using a table based translation.

4. The method of claim 1, wherein the step of correlating comprises mapping the resource locator to the resource identifier using a monotonically increasing number.

5. The method of claim 1, wherein the step of correlating comprises mapping the resource locator to the resource identifier using a hashing function.

6. The method of claim 1, further comprising:
receiving a request to receive information associated with the resource identifier; and
resolving the resource identifier to produce the resource locator.

7. The method of claim 6, further comprising transmitting the information to the wireless device using a high bandwidth channel.

8. An apparatus for substituting a resource locator in a data network for transmission over a low bandwidth channel to a wireless device, the apparatus comprising: a processor operable to execute: detection logic for detecting a resource locator in a message transmitted to the wireless device; determination logic for determining whether the resource locator exceeds a selected length; in response to a determination by the determination logic that the resource locator exceeds the selected length, correlation logic for correlating the resource locator with a corresponding resource identifier that is shorter in length than the resource locator; processing logic for substituting the resource identifier for the resource locator in the message to form an updated message; and transmitting logic for transmitting the updated message to the wireless device using the low bandwidth channel.

9. The apparatus of claim 8, wherein the correlation logic comprises logic operable to map the resource locator to the resource identifier using a table based translation.

10. The apparatus of claim 8, further comprising resolving logic operable to resolve the resource identifier to obtain the resource locator.

11. An apparatus for substituting a resource locator in a data network for transmission over a low bandwidth channel to a wireless device, the apparatus comprising:
detection means for detecting a resource locator in a message transmitted to the wireless device,
determination means for determining whether the resource locator exceeds a selected length;
correlation means, responsive to a determination by the determination means that the resource locator exceeds the selected length, for correlating the resource locator to produce a corresponding resource identifier that is shorter in length than the resource locator;
substitution means for substituting the resource identifier for the resource locator in the message to form an updated message; and
transmission means for transmitting the updated message to the wireless device using the low bandwidth channel.

12. The apparatus of claim 11, further comprising resolving means for resolving the resource identifier to obtain the resource locator.

13. A computer-readable medium comprising instructions which, when executed by a computer, cause the computer to perform operations, the instructions comprising:
at least one instruction for detecting a resource locator in a message transmitted to the wireless device;
at least one instruction for determining whether the resource locator exceeds a selected length, and if the resource locator exceeds the selected length:
at least one instruction for correlating the resource locator to obtain a corresponding resource identifier that is shorter in length than the resource locator;
at least one instruction for substituting the resource identifier for the resource locator in the message to form an updated message; and
at least one instruction for transmitting the updated message to the wireless device using the low bandwidth channel.

14. The computer-readable medium of claim 13, the instructions further comprising at least one instruction for resolving the resource identifier to obtain the resource locator.

15. A wireless device for use in a wireless network, the wireless device operable to receive information associated with a network resource that is identified by a resource locator, the wireless device comprising: a processor operable to execute: logic for receiving a resource identifier from the wireless network using a low bandwidth channel, wherein the resource identifier is a substituted, shortened version of the resource locator only when the resource locator was determined to exceed a selected length; logic for resolving the resource identifier to produce the resource locator; and logic for accessing the information associated with the resource locator over the wireless network.

16. The wireless device of claim 15, wherein the logic operable to resolve comprises:
logic operable to request a network server to resolve the resource identifier; and
logic operable to receive the resource locator from the network server.

17. A computer-readable medium comprising instructions which, when executed by a computer, cause the computer to perform operations, the instructions comprising: at least one instruction for detecting a resource locator in a message transmitted to the wireless device; at least one instruction for determining whether the resource locator exceeds a selected length; in response to a determination that the resource locator exceeds the selected length, at least one instruction for correlating the resource locator with a corresponding resource identifier that is shorter in length than the resource locator; at least one instruction for substituting the resource identifier for the resource locator in the message to form an updated message; and at least one instruction for transmitting the updated message to the wireless device using the low bandwidth channel.

18. The carrier wave signal of claim 17, further comprising at least one program instruction for causing the processor to resolve the resource identifier to obtain the resource locator.

* * * * *